United States Patent [19]

Matthews et al.

[11] 3,722,542
[45] Mar. 27, 1973

[54] PRESSURE BIASED POWER TAKE-OFF VALVE

[75] Inventors: Ralph W. Matthews, New Berlin; Nicholas W. Semeniak, Milwaukee, both of Wis.

[73] Assignee: Allis Chalmers Corporation, Milwaukee, Wis.

[22] Filed: Nov. 23, 1971

[21] Appl. No.: 201,292

[52] U.S. Cl..............................137/596.1
[51] Int. Cl................................F16k 11/10
[58] Field of Search..................137/596.1, 596.2

[56] References Cited

UNITED STATES PATENTS 2,945,481   7/1960   Carls.........................137/596.1

Primary Examiner—Henry T. Klinksiek
Attorney—Arthur L. Nelson et al.

[57] ABSTRACT

A pressure control valve for a power take-off clutch and brake which is pressure biased to a clutch operating position when the valve is initially positioned in the clutch operating position.

10 Claims, 3 Drawing Figures

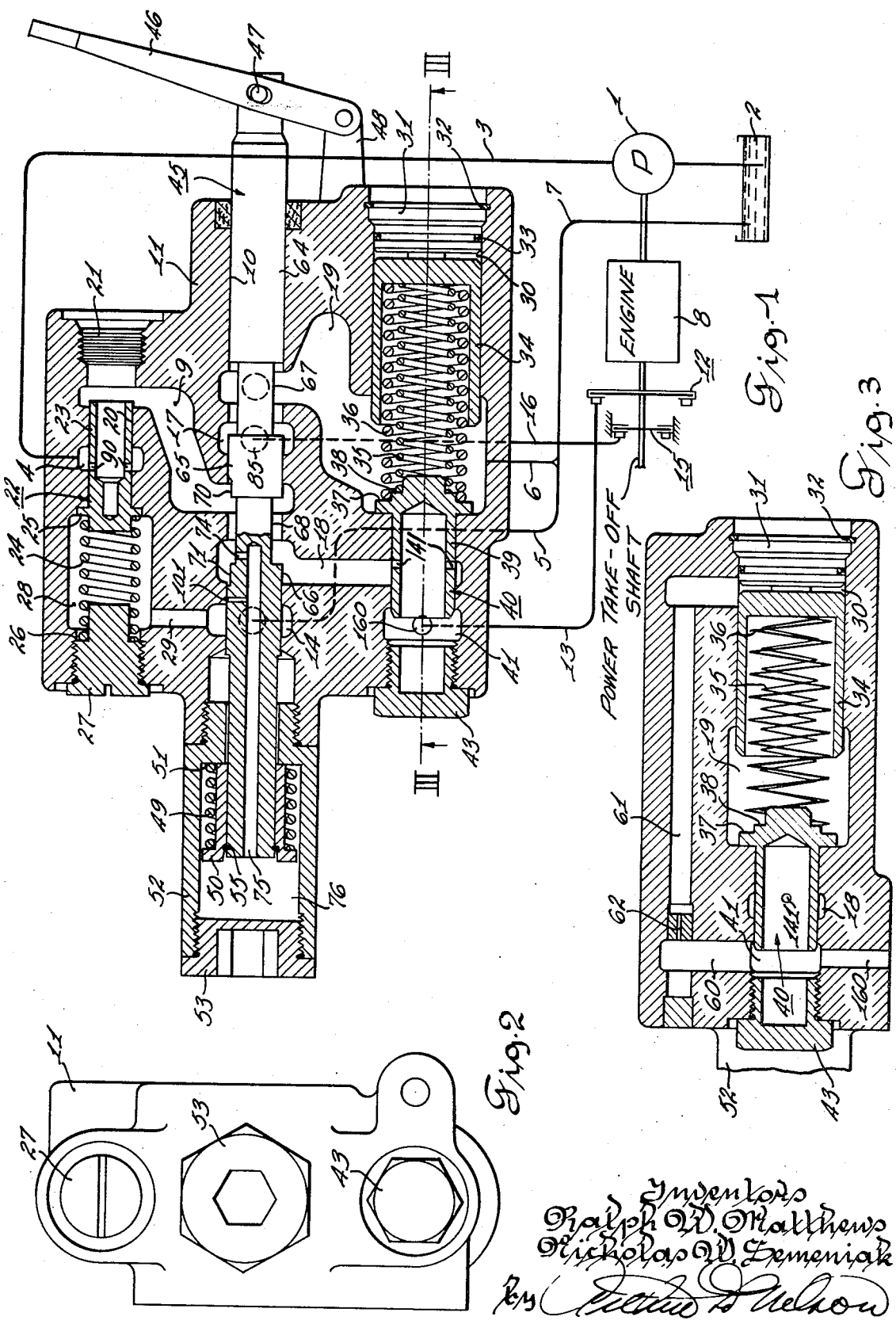

PRESSURE BIASED POWER TAKE-OFF VALVE

This invention relates to a hydraulic valve and more particularly to a control valve for a power take-off clutch and brake having means for retaining the valve in the operating position by the hydraulic pressure of the pressurized fluid for engaging the clutch.

The conventional power take-off shaft of a tractor is used to drive accessory equipment such as implements which require power for their operation. The power take-off shaft generally extends from the tractor at a point which is convenient for connection to the implement. Generally when the clutch alone is disengaged and no brake is used, a certain amount of rotation is transmitted to the power take-off shaft which extends from the tractor.

Although some power take-off shafts are in constant rotation as long as the engine of the vehicle is in rotation, for safety purposes it is generally considered that a disengaging clutch between the drive and the driven power take-off shafts is desirable. Accordingly, a control valve is used to engage the clutch and another valve may be used to engage the brake to provide the proper control for the power take-off shaft. Although shields have been provided as safety features to guard against entangling wearing apparel around the power take-off shaft, it is more desirable to have an automatic control for braking the power take-off shaft so the danger is eliminated and the power take-off shaft is braked as soon as the clutch is disengaged.

Accordingly, a power take-off shaft having a hydraulically actuated clutch and brake can be operated through a single valve to simultaneously engage the clutch and disengage the brake and vice versa when the brake is engaged to disengage the clutch. This type of a valve is used with a detent mechanism to hold the actuating lever for the hydraulic control valve in one position or another. There is, however some advantage in having this valve control automatic so that once the vehicle engine is stopped and the pump in the hydraulic system no longer supplies pressurized fluid, that the clutch be disengaged. This prevents accidentally starting the engine with the power take-off engaged and eliminates any drag encountered in rotating the power take-off shaft when the vehicle engine is started. Accordingly, this invention provides a control valve without a detent mechanism which can be manually positioned to engage the clutch and disengage the brake through hydraulic means.

Accordingly, it is an object of this invention to provide a control valve for a power take-off clutch and brake.

It is another object of this invention to provide a control valve for a power take-off clutch and brake with hydraulic means for retaining the valve in the clutch engaging position and a spring for returning the valve to disengage the clutch when the engine was stopped and the source of pressurized fluid is no longer operating.

It is a further object of this invention to provide a control valve operating a power take-off clutch and brake having manual means to operate said valve with hydraulic means to retain the clutch engaged and the brake disengaged, and spring means to disengage the clutch when the fluid in the system is no longer pressurized.

It is a further object of this invention to provide a power take-off clutch and brake control valve with hydraulic means for retaining the valve in the clutch engaging position and a spring for returning the control valve to a clutch disengaging position when the fluid in the system is no longer pressurized.

Accordingly, the objects of this invention are accomplished with a power take-off shaft driven by the engine through a clutch to a stub shaft extending externally of the tractor. The clutch transmits power to the stub power take-off shaft extending externally of the tractor. A brake is also positioned for braking the rotation of the stub power take-off shaft once the clutch is disengaged. The clutch and brake are hydraulically actuated. The hydraulic control valve operates to engage the clutch and disengage the brake simultaneously and vice versa engage the brake and disengage the clutch when the control valve is manually shifted. When the engine of the vehicle is stopped, the source of pressurized fluid or pump is also stopped and the fluid within the system is no longer pressurized. Under these circumstances the brake is also released and there is no drag on the power take-off shaft when the vehicle engine is started.

Referring to the drawings, the preferred embodiment of this invention is illustrated.

FIG. 1 illustrates a cross section view of the power take-off valve and schematically illustrates the hydraulic system.

FIG. 2 is an end view of the power take-off valve.

FIG. 3 is a cross section view taken on line III—III in FIG. 1.

Referring to the drawings, FIG. 1 illustrates a pump 1 operating from a sump 2 to pressurize fluid in the conduit 3. The conduit 3 is connected to the inlet passage 4. The conduits 5 and 6 are connected to sump passages in the valve and also are connected through conduit 7 to the sump 2.

The pump 1 is driven by an engine 8 and is continuously in operation when the vehicle engine is operated. The passage 4 is connected through ports 90 in sleeve 23 to the high pressure inlet 9 which in turn is connected to the central bore 10 in the housing 11. The clutch 12 is connected through the conduit 13 to the clutch actuating passages 160, 41 and clutch actuating chamber 18 in the control valve. The accumulator chamber 30 is connected to the clutch actuating passage 14 through passages 61 and 60 and orifice 62. The brake 15 is connected through the conduit 16 to the brake actuating passage 85 and chamber 17. The central bore 10 is connected to the brake and clutch actuating chambers, as well as the inlet chamber 9. The sump chamber 14 and chamber 19 are connected to the sump conduits 5 and 6 respectively, and to the central bore 10.

The inlet passage 4 is in communication with high pressure chamber 9 through the pressure limiting valve 22 in the cylindrical opening 20. The cylindrical opening 20 threadedly receives a plug 21 in the right hand end of the housing 11. The pressure limiting valve consists of a sleeve 23 having ports 90 in communication with the inlet passage 4 and the chamber 9. The sleeve 23 is biased in the right hand direction by the spring 24 which engages a flange 25 on the sleeve 23 and also engages radial surface 26 of the cap 27. The force of the spring 24 regulates the pressure in the high pressure chamber 9. The spring chamber 28 is connected to the passage 29 to the sump chamber 14.

The accumulator chamber 30 is formed in the lower part of the housing 11 with the plug 31 which is held in position by a snap ring 32. A seal 33 is positioned in the annular recess of the plug 31 which engages the housing 11 to seal the accumulator chamber 30.

The barrel 34 reciprocates in the chamber 30 which in turn receives the springs 35 and 36 which engage radial surfaces 37 and 38 on the end of the plunger 39. The plunger 39 forms a part of the pressure limiting valve 40 having radial ports 141 to control fluid flow from the clutch actuating chamber 18 to the passage 41. If the pressure in the clutch passage 18 rises more rapidly than a predetermined rate, it will cause the pressure limiting valve 40 to close off communication between the clutch chamber 18 and the passage 41. The cap 43 threadedly engages the end of the opening formed by the clutch passage 41.

The central bore 10 receives a spool 45. The spool 45 is operated through pin 47 pivotally connecting manual control lever 46 which is pivotally supported on the bracket 48 of the housing 11. The spool 45 reciprocates within the central bore 10 in response to manual operation of the lever 46. A return spring 49 is compressed between the spring retainer 50 and the radial surface 51 of the barrel 52. The barrel 52 threadedly engages the housing 11 and the nut 53 threadedly engages the barrel 52. The spring retainer 50 is connected to the end of the spool 45 by a snap ring 55.

The spool 45 includes the lands 64, 65 and 66 which generally form annular grooves 67 and 68. Throttling orifices 70 and 71 are formed on lands 65 and 66 respectively for throttling fluid flowing to the clutch chamber and retarding flow to sump during initial actuation of the clutch. Orifice passage 101 vents pressurized fluid to sump to limit pressure build-up initially during clutch actuation.

The spool also forms a radial port 74 and an axial passage 75 which extend to the end of the spool 45 leading into the pressure control chamber 76. The port 74 and passage 75 permit pressurized fluid to flow into the chamber 76 when the clutch is actuated biasing the spool against the force of the spring 49 to retain the control valve in the clutch operating position.

The control valve operates in the following manner. The pump 1 receives fluid from the sump 2 and is driven by the engine 8. The pump 1 pressurizes fluid in the conduit 3 which is supplied to the inlet passage 4 to the pressure limiting valve 22. The pressurized fluid flows through the ports 90 into the chamber 9 which surrounds the bore 10.

The lever 46 is used to manually operate the control valve. The control lever 46 can override the operation of the spring 49 on the spool which normally biases the spool to a brake actuating position. The control lever 46 is used to operate the valve against the force of the spring 49 to actuate the clutch and actuation of the clutch permits the pressurized fluid to flow into the pressure control chamber 76 to maintain the valve in the open position. The control lever 46 can also be operated to position the valve so that neither the brake nor the clutch are engaged.

Spring 49, however, normally returns the piston to the forward position in which pressurized fluid from the chamber 9 passes through the bore 10 to the brake actuating chamber 17. The brake actuating chamber 17 is connected through the passage 85 and conduit 16 to a hydraulic fluid pressurizing chamber in the brake 15 for normally actuating the brake. In this position the clutch actuating chamber 18, which is in communication with the hydraulic actuator in the clutch 12 through conduit 13, is connected to the sump chamber 14 and passage 29. The sump chamber 14 and passage 29 are connected to spring chamber 28 and return conduits 5 and 7 to the sump 2. In the brake actuating position there is sump pressure in the control chamber 76 and the springs overcome any fluid forces in the chamber 76 and maintain the valve in the position to disconnect the clutch and engage the brake.

When it is desired to engage the clutch and disengage the brake, the control lever 46 moves in a clockwise direction. This moves the spool 45 in a right hand direction with annular groove 67 opening the sump chamber 19 which is connected through the sump conduits 5 and 7 to sump 2 to the brake actuating chamber 17.

This relieves the pressure in the hydraulic actuator of the brake 15, and also closes communication between the high pressure inlet chamber 9 and the brake chamber 17.

As the control lever 46 continues to move in a clockwise direction, the spool 45 continues to move in a right hand direction. The throttling groove 70 permits restricted flow from the inlet chamber 9 to the clutch actuating chamber 18 when the orifice passage 101 and throttling groove 71 vent a portion of the pressurized fluid to the sump chamber 14. The pressure increases in the clutch actuating chamber 18 and if the opening between the inlet chamber 9 and the clutch actuating chamber 18 is too rapid, the pressure limiting valve 40 operates. The operation of the pressure limiting valve 40 is in response to pressurized fluid in chamber 41 biasing the sleeve 39 against the force of the springs 35 and 36. This closes the ports 141 in sleeve 39 and momentarily retards the pressure build-up in the hydraulic actuator of clutch 12. Pressure in passage 41 builds up as fluid flows through passage 60, orifice 62, passage 61 to the accumulator chamber 30 against the force of springs 35 and 36. Normally, the pressure build-up in the clutch 12 is gradual and as the spool 45 moves in the right hand direction the throttling groove 70 moves beyond the edge of the inlet chamber 9 permitting more rapid flow to the clutch actuating chamber 18. As the spool 45 continues to move in a right hand direction, the orifice passage 101 moves beyond the sump chamber 14 and into the bore and closes communication between axial passage 75 and sump chamber 14. In this position the clutch 12 is actuated and the pressurized fluid flows into the pressure control chamber 76 to maintain the clutch in the actuated position.

The cross port 74 in the spool 45 connects with axial passage 75 to provide communication with the hydraulic control chamber 76. With the communication between the high pressure chamber 9, clutch chamber 18 and the control chamber 76, the force of the pressurized fluid in chamber 76 biases the spool all the way to the right compressing the spring 49. So long as the control lever is not manually operated to overcome the force of fluid pressure in control chamber 76 and the pressure in the high pressure inlet 9 is maintained, the control valve will remain in this position. Accordingly, the clutch is engaged and the power take-off shaft delivers the power to the output of the power take-off assembly.

When the engine 8 is stopped the pump 1 is also stopped and there is no longer pressure in the conduit 3 or the inlet chamber 9. With the decrease in the pressure in the inlet chamber 9, clutch chamber 18, and correspondingly the control chamber 76, the spring 49 biases the spool 45 of the control valve to a left hand position. This in turn closes off communication between the inlet chamber 9 and the clutch chamber 18 and provides communication between the inlet chamber 9 and the brake chamber 17. With no pressure in the line, however, neither the brake nor the clutch are actuated, and the control valve remains in this position.

When the engine is started and the pump begins, pressurized fluid flows into the inlet chamber 9 and the brake is again actuated.

Accordingly, the control valve does not use a mechanical detent to maintain the spool in a position for engaging the clutch and disengaging the brake. Any change in position once the clutch is actuated must be provided through the control lever 46 unless the pump pressure is decreased to a point that the spring 49 overcomes the pressure of the fluid in chamber 76. Then the shifting of the control valve to actuate the brake and disengage the clutch is automatic. It can be seen that after starting the engine there is no danger of a live power take-off shaft to the operator because the brake is automatically operated unless the operator specifically operates the control lever 46 to engage the clutch and disengage the brake.

The embodiments of the invention in which an exclusive property or privilege is claimed are defined as follows:

1. A power take-off control valve comprising a valve housing defining a bore connected to an inlet passage adapted for connection to a pump, a sump passage adapted for connection to a sump, a clutch passage adapted for connection to a power take-off clutch, and a brake passage adapted for connection to a power take-off brake, a valve element received in said bore, a spring biasing said valve element to a position connecting the inlet passage to said brake passage and connecting said clutch passage to said sump passage, said housing and said valve element defining a pressure control chamber in the end of said bore, means defining a pressure control passage selectively in communication with said clutch passage and said control chamber for receiving pressurized fluid from said inlet passage for biasing said valve element to a position providing communication between the clutch passage and the inlet passage and connecting the brake passage to the sump passage and thereby retaining said valve element in this position until pressure is released in said clutch passage.

2. A power take-off control valve as set forth in claim 1 including a pressure limiting valve in said inlet passage means for limiting the inlet pressure provided to said control valve.

3. A power take-off control valve as set forth in claim 1 including a pressure limiting valve in said clutch passage to limit the pressure of pressurized fluid supplied through said clutch passage.

4. A power take-off control valve as set forth in claim 1 including a spring received in said pressure control chamber of said control valve for biasing said control valve element to a position for disconnecting said clutch passage and connecting said brake passage with said inlet passage.

5. A power take-off control valve as set forth in claim 1 wherein said control element defines a spool, said spool defines a radial passage and an axial passage to provide communication between said clutch passage and said pressure control chamber when said clutch passage receives pressurized fluid from said inlet passage.

6. A power take-off control valve as set forth in claim 1 wherein said control valve element defines a spool, means defining lands and grooves on said spool, a cross passage in one of said grooves, an axial passage connecting said cross passage and extending to the end of said spool to provide communication from said pressure control chamber to said clutch passage.

7. A power take-off control valve as set forth in claim 1 wherein said control valve element defines a spool, a control lever pivotally supported on said housing and pivotally connected to said spool to provide manual actuating means for said control valve.

8. A power take-off control valve as set forth in claim 1 wherein said valve element defines an orifice communicating between said clutch passage and said sump to vent pressurized fluid from said clutch passage to sump during initial connecting between said inlet passage and said clutch passage.

9. A power take-off control valve as set forth in claim 1 wherein said spool defines throttling groove for throttling fluid during initial connection between the inlet passage and the clutch passage.

10. A power take-off control valve as set forth in claim 1 wherein said valve housing and said valve element define a pressure control chamber, passage means selectively connecting said clutch passage with said pressure control chamber when said inlet passage is connected to said clutch passage.

* * * * *